United States Patent [19]

Klopfenstein et al.

[11] Patent Number: 4,834,225
[45] Date of Patent: May 30, 1989

[54] NO-BACK MECHANISM

[75] Inventors: Brent A. Klopfenstein; David J. Lang, both of Rockford, Ill.

[73] Assignee: Sundstrand Corporation, Rockford, Ill.

[21] Appl. No.: 83,228

[22] Filed: Aug. 10, 1987

[51] Int. Cl.[4] .............................................. B60T 7/12
[52] U.S. Cl. ................................. 192/7; 74/424.8 R; 188/134
[58] Field of Search ................... 192/7, 8 R; 188/134; 74/424.8 R

[56] References Cited

U.S. PATENT DOCUMENTS

| | | | |
|---|---|---|---|
| 1,572,635 | 2/1926 | Bostwick | 192/8 R |
| 2,341,753 | 2/1944 | Zwald. | |
| 2,543,482 | 2/1951 | Williams. | |
| 2,653,691 | 9/1953 | Weiland | 192/8 R |
| 2,918,275 | 12/1959 | Arlauskas | 192/8 R X |
| 3,630,328 | 12/1971 | Nelson | 192/8 R |
| 3,898,890 | 8/1975 | Simmons et al. | 192/8 R X |
| 3,976,172 | 8/1976 | Geppert | 192/8 R |
| 3,976,173 | 8/1976 | Spencer | 192/8 R |
| 4,480,733 | 11/1984 | Grimm et al. | 192/8 R |
| 4,697,672 | 10/1987 | Linton | 192/7 X |

Primary Examiner—Rodney H. Bonck
Assistant Examiner—Richard M. Lorence
Attorney, Agent, or Firm—Wood, Dalton, Phillips, Mason & Rowe

[57] ABSTRACT

A no-back mechanism including a rotatable screw shaft 16, rotatable drive element 70 on the screw shaft 16, a limited lost motion connection 72 between the screw shaft 16 and the drive element 70, a thrust plate 28 on the screw shaft 16, first and second friction discs 30, 32 sandwiching the thrust plate 28 and being journaled by bearings 38, 40 for rotation with the thrust plate 28, first and second one way clutches 54, 56 respectively associated with the first and second friction discs 30, 32 for respectively allowing the first friction disc 30 to rotate in one direction but not the other and for allowing the second friction disc 32 to rotate in the other direction but not in the first direction, a ratchet ring 86, 88 surrounding the screw shaft 16, first and second oppositely directed pawls 104, 106 carried by the screw shaft 16 and engageable with the ratchet ring 86, 88 for preventing relative motion between the screw shaft 16 and the ratchet ring 86, 88 in the direction the associated pawl 104, 106 is directed, and a pawl operator 116 carried by the drive element 70 and operable to disengage one or the other of the pawls 104, 106 from the ratchet ring 86, 88, dependent upon the direction of rotation of the drive element 70 as the drive element 70 moves relative to the screw shaft 16 through the limited lost motion connection 72.

3 Claims, 2 Drawing Sheets

NO-BACK MECHANISM

FIELD OF THE INVENTION

This invention relates to a so-called 'no-back' mechanism, that is, to a mechanism that is intended to prevent a load from driving a driving device.

BACKGROUND OF THE INVENTION

No-back mechanisms have long been used in a variety of applications wherein a load is moved bidirectionally by a motor or prime mover or the like and wherein in at least one direction of movement, some force existing on the load can operate to cause the load to drive the prime mover or motor. Examples include winch systems and actuating systems for control surfaces on aircraft.

In the design of conventional no-back mechanisms, brakes are employed and are typically called into play when a load tends to drive the prime mover or motor. In a typical brake so used, the coefficient friction may vary as much as 300% depending upon humidity, oil in the environment and other factors. As a consequence, many such no-back mechanisms are designed for the worst case situation, namely, to act effectively for the least coefficient of friction that may be encountered.

This in turn results in a typical no-back mechanism being over designed for normal usage. This over design adds to the cost of the no-back mechanism as well as to the weight thereof. Excessive cost is always undesirable as is excessive weight, particularly in one frequent environment of use of no-back mechanisms, aircraft.

The present invention is directed to overcoming one or more of the above problems.

SUMMARY OF THE INVENTION

It is the principal object of the invention to provide a new and improved no-back mechanism. More specifically, it is an object of the invention to provide a highly reliable no-back mechanism whose size and weight may be minimized.

An exemplary embodiment of the invention achieves the foregoing object in a construction including a rotatable screw shaft with a rotatable drive element on the screw shaft. A thrust plate is also located on the screw shaft and first and second friction discs sandwich the thrust plate with the friction discs being journaled for rotation with the thrust plate. First and second one-way clutches are respectively associated with the first and second friction discs for respectively allowing the first friction disc to rotate in one direction but not the other and for allowing the second friction disc to rotate in the other direction but not the one.

The construction includes a ratchet ring surrounding the screw shaft along with first and second oppositely directed pawls carried by the screw shaft and engageable with the ratchet ring for preventing relative motion between the screw shaft and the ratchet ring in the direction the associated pawl is directed, and there are means provided for selectively disengaging one or the other of the pawls dependent upon the direction of rotation of the drive element and when the screw shaft is not overriding the drive element.

As a result of this construction, the size of the brake elements may be minimized so as to be sized for normal operation at typical coefficients of friction with the pawls and ratchet ring providng all the necessary restraint that may be required in the event of operation in an environment that causes the coefficient of friction to be at a low level.

In a highly preferred embodiment, a limited lost motion connection is provided between the screw shaft and the drive element which may serve as part of the selective disengaging means. The selective disengaging means further includes a pawl operator means carried by the drive element and operable to disengage one or the other of the pawls from the ratchet ring dependent upon the direction of rotation of the drive element as the drive element moves relative to the screw shaft through the limited lost motion connection.

In a highly preferred embodiment, the no-back mechanism includes a housing and the housing is adapted to be stationarily mounted. The ratchet ring is affixed to the housing.

The invention contemplates that the one-way clutches be overrunning clutches which interconnect the associated friction discs and the housing.

In a highly preferred embodiment, first and second thrust bearings respectively journal the first and second friction discs and have races mounting respective ones of the friction discs. The overrunning clutches interconnect the corresponding race in the housing.

Where the pawl operator means is provided, it preferably comprises a single operator carried by the drive element. Generally, the single operator may be an axial post projecting from the drive element to a location between the pawls.

Other objects and advantages will become apparent from the following specification taken in conjunction with the accompanying drawings.

DESCRIPTION OF THE PREFERRED EMBODIMENT

Figure 1:
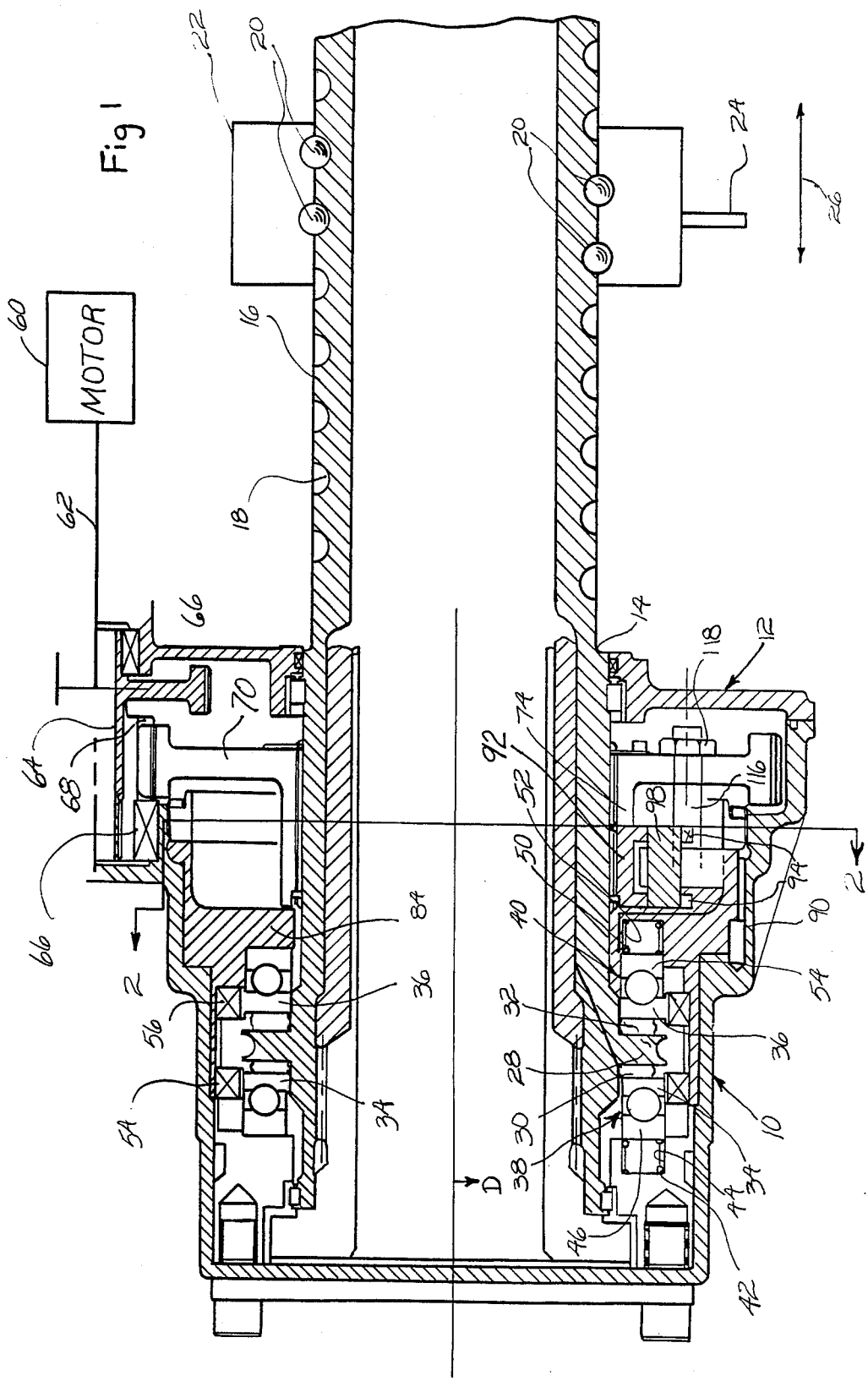
FIG. 1 is a partially schematic, sectional view of a no-back made according to the invention.

An exemplary embodiment of a no-back mechanism made according to the invention is illustrated in the drawings and with reference to FIG. 1 is seen to include a generally cup-shaped housing, generally designated 10, closed at one end by an end cap, generally designated 12. The end cap 12 includes a central opening 14 through which a screw shaft 16 extends. The screw shaft, exteriorly of the housing 10, includes a helical groove 18 which receives balls 20 and an associated ball nut 22.

The ball nut 22 carries a connector 24 which may be connected by any suitable means to a load and the load will generally act axially on the screw shaft 16, that is, in the direction of a bidirectional arrow 26.

Within the housing 10, the screw shaft 16 includes a radially outwardly directed, peripheral collar 28 which acts as a thrust plate. Flanking the thrust plate 28 is a pair of friction discs 30 and 32 which are mounted on races 34 and 36 of thrust bearings, generally designated 38 and 40, respectively.

Springs 42 in axial bores 44 (only one shown) bias the race 46 of the bearing 38 toward the race 34. Similar springs 50 in bores 52 act against a race 54 of the bearing 40 to bias the same toward the race 36. The purpose of the just described structure is to assure that the bearings 38 and 40 do not become disassembled.

The race 34 is connected via a one-way clutch 54 in the form of a conventional overrunning clutch to the housing 10 while the race 36 is similarly connected by a one way, overrunning clutch 56 to the housing 10 as well. However, the clutches 54 and 56 are oppositely oriented within the housing so that the race 34, and thus the friction disc 30, may rotate freely in one direction within the housing 10 and be grounded to the housing 10 when a rotation in the opposite direction is attempted while the race 36 and associated friction disc 32 may rotate freely in the other direction within the housing and be grounded to the housing when rotation in the direction in which the race 34 may freely move is attempted.

In its intended environment of use, the no-back mechanism will be interposed between a prime mover or a motor shown schematically at 60 and the load shown schematically at 26. The motor 60 includes a rotary output 62 which is coupled to a shaft 64 shown fragmentarily in FIG. 1. The shaft 64 is journaled by a bearing 66 and includes a gear 68 meshed with a gear 70 concentric with the screw shaft 16 and located within the housing 10.

Figure 2:
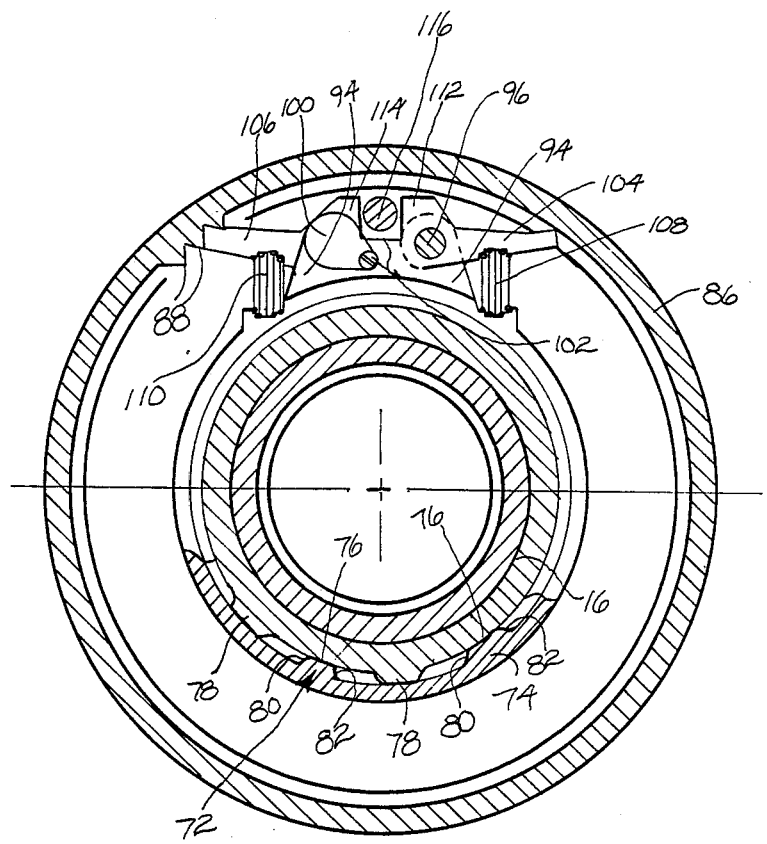
FIG. 2 is a sectional view taken approximately along the line 2—2 in FIG. 1.

As best seen in FIG. 2, a limited lost motion connection, generally designated 72, exists between the screw shaft 16 and the hub 74 of the gear 70. In particular, the hub 74 includes a plurality of radially inwardly directed, axially elongated splines or teeth 76 while the screw shaft 16 includes similar, axially elongated but radially outwardly directed teeth or splines 78. The angular or circumferential extent of the teeth 78 is considerably less than the spacing between adjacent teeth with the consequence that the screw shaft 16 may move relative to the hub 74 in one direction until the teeth 78 bottom out against one side surface 80 of the teeth 76 and in the opposite direction until the teeth 78 bottom out against the opposite side surface 82 of the teeth 76.

Returning to FIG. 1, an annular insert 84 is located within the housing 10 and includes a radially outer extension 86 which extends axially toward the gear 70. As best seen in FIG. 2, the radially inner surface of the extension 86 includes radially inwardly directed ratchet teeth 88 such that the extension 86 and teeth 88 define a ratchet ring. The insert 84 is secured to the housing 10 to prevent relative rotation therebetween by means of, for example, one or more pins 90 (FIG. 1).

Disposed between the hub 74 of the gear 70 and the insert 84 is a ring 92 that is splined to the screw shaft 16 for rotation therewith. The ring 92 includes a pair of radially outwardly extending, axially spaced ears 94 and at circumferentially spaced locations, first and second pivot pins 96 (FIG. 2) and 98 (FIG. 1) extend between the ears 94. The pin 98 is prevented from axial displacement by a cover plate 100 retained in place by a screw 102 as seen in FIG. 2 and a similar means of retention is utilized in connection with the pin 96.

The pins 96 and 98 mount oppositely directed pawls 104 and 106 which are respectively biased by springs 108 and 110 toward the ratchet teeth 88. The pawls 104 and 106 also have arms 112 and 114 respectively that are separated by a small gap as best seen in FIG. 2. An axially extending pin 116 secured as by a retaining nut 118 to the gear 70 extends between the arms 112 and 114 as best seen in FIG. 2.

Thus, if the motor 60 drives the gear 70 in a counterclockwise direction relative to the screw shaft 16 as viewed in FIG. 2, the post 116 will engage the arm 114 on the pawl 106 and move the same against the bias of the spring 110 out of engagement with the teeth 88. If the motor drives the gear 70 in a clockwise direction relative to the screw shaft 16, the arm 112 of the pawl 104 will be engaged and the pawl 104 will be moved against the bias of the spring 108 out of engagement with the teeth 88.

Similarly, if the pawl 104 has been moved out of engagement with the teeth 108 by engagement of the post 116 with the arm 112, and the screw shaft 116 begins to overrun the input gear 70 in the clockwise direction, the ears 94 will advance in the clockwise direction relative to the post 116 bringing the latter out of engagement with the arm 112 allowing the pawl 104 to engage the teeth 88 under the bias of the spring 108. If the overrunning occurs in the opposite or counter clockwise direction, similar engagement of the pawl 106 with the teeth 88 will likewise occur.

The opertion of the mechanism is as follows. It will firstly be appreciated by those skilled in the art that there will be a small but certain amount of axial play in the mounting of the screw shaft 16. When the same is at its left most position within the limits of such play, the thrust plate 28 will be essentially out of frictional engagement with the friction disc 32 associated with the thrust bearing 40 whereas when the screw shaft 16 is in its right most position within the range of play, the thrust plate 28 will likewise be out of any substantial frictional engagement with the friction disc 30 associated with the thrust bearing 38.

The clutches 54 and 56 are so oriented with respect to the loading that when the motor 60 is driving an opposing load in either direction, the one of the friction discs 30 and 32 then being engaged by the thrust plate 28 as a result of the axial play and the opposing load will be free to rotate through its associated overrunning clutch 54 and 56. Consequently, the screw 16 may rotate with thrust being taken up by the appropriate one of the bearings 38 and 40.

Where the loading is an aiding load and the screw shaft 16 attempts to back drive the motor 60 as a consequence, for the same direction of the motor 60, the shaft 16 will move axially to the opposite limit of play. Consequently, the thrust plate 28 will engage one or the other of the friction discs 30 and 32 which will be held stationary against rotation by its associated overrunning clutch 54 or 56 to prevent the laod from driving the motor 60.

If the frictional force thus developed is insufficient to prevent such driving then, as mentioned previously, the tendency to overrun will result in relative movement between the gear 70 and the screw shaft 16 causing the appropriate one of the pawls 104 and 106 to be released from its nonengaged position by movement of the actuator post 116 away from the associated arm 112 or 114. This, of course, will ground the ring 92 to the housing 10 and because the ring 92 is rigidly splined to the screw shaft 16, prevent further rotation of the latter relative to the housing until the engaged pawl 104, 106 is once again disengaged.

As a consequence of this construction, the brake elements including the friction discs 30 and 32 as well as the thrust plate 28 need not be 'over designed' as in conventional constructions to compensate for varying coefficients of friction. For if the coefficient of friction does vary below the minimum employed in the design and used to size the friction discs 30 and 32, the action of the pawls 104 and 106 in engaging the ratchet teeth 88 will prevent any slippage.

We claim:

1. A no-back comprising:
   a rotatable screw shaft rotatable about an axis;
   a rotatable drive element carried by said screw shaft;
   a limited lost motion connection between said screw shaft and said drive element;
   a thrust plate carried by said screw shaft;
   first and second frictions discs sandwiching said thrust plate, said friction discs being journalled for rotation about said axis;
   first and second one-way clutches respectively associated with said first and second friction discs for respectively allowing said first friction disc to rotate in one direction but not the other and allowing said second friction disc to rotate in said other direction but not in said one direction;
   ratchet ring means surrounding said screw shaft;
   first and second oppositely directed pawls carried by said screw shaft and engageable with said ratchet ring means for preventing relative motion between the screw shaft and the ratchet ring means in the direction the associated pawl is directed;
   a pawl operator means carried by said drive element and operable to disengage one of said pawls from said ratchet ring means for one direction of rotation of said drive element as said drive element moves relative to said screw shaft through said limited lost motion connection, and further operable to disengage the other of said pawls from said ratchet ring means for the opposite direction of rotation of said drive element as said drive element moves relative to said screw shaft through said lost motion connection; and
   a housing, said housing being adapted to be stationarily mounted with said ratchet ring means being affixed to said housing;
   said one-way clutches being overrunning clutches interconnecting the associated friction disc and said housing.

2. The no-back of claim 1 wherein first and second thrust bearings respectively journal said first and second friction discs and have races mounting respective ones of said friction discs, said overrunning clutches interconnecting a corresponding race and said housing.

3. A no-back comprising:
   a rotatable screw shaft rotatable about an axis;
   a rotatable drive element carried by said screw shaft;
   a limited lost motion connection between said screw and said drive element;
   a thrust plate carried by said screw shaft;
   first and second frictions discs sandwiching said thrust plate, said friction discs being journalled for rotation about said axis;
   first and second one-way clutches respectively associated with said first and second friction discs for respectively allowing said first friction disc to rotate in one direction but not the other and allowing said second friction disc to rotate in said other direction but not in said one direction;
   ratchet ring means surrounded by said screw shaft;
   first and second oppositely directed pawls carried by said screw shaft and engageable with said ratchet ring means for preventing relative motion between the screw shaft and the ratchet ring means in the direction the associated pawl is directed;
   a pawl operator means carried by said drive element and operable to disengage one of said pawls from said ratchet ring means for one direction of rotation of said drive element as said drive element moves relative to said screw shaft through said limited lost motion connection, and further operable to disengage the other of said pawls from said ratchet ring means for the opposite direction of rotation of said drive element as said drive element moves relative to said screw shaft through said lost motion connection, said pawl operator means comprising a single operator on said drive element, said single operator being an axial post projecting from said drive element to a location between said pawls.

* * * * *